Patented Sept. 6, 1949

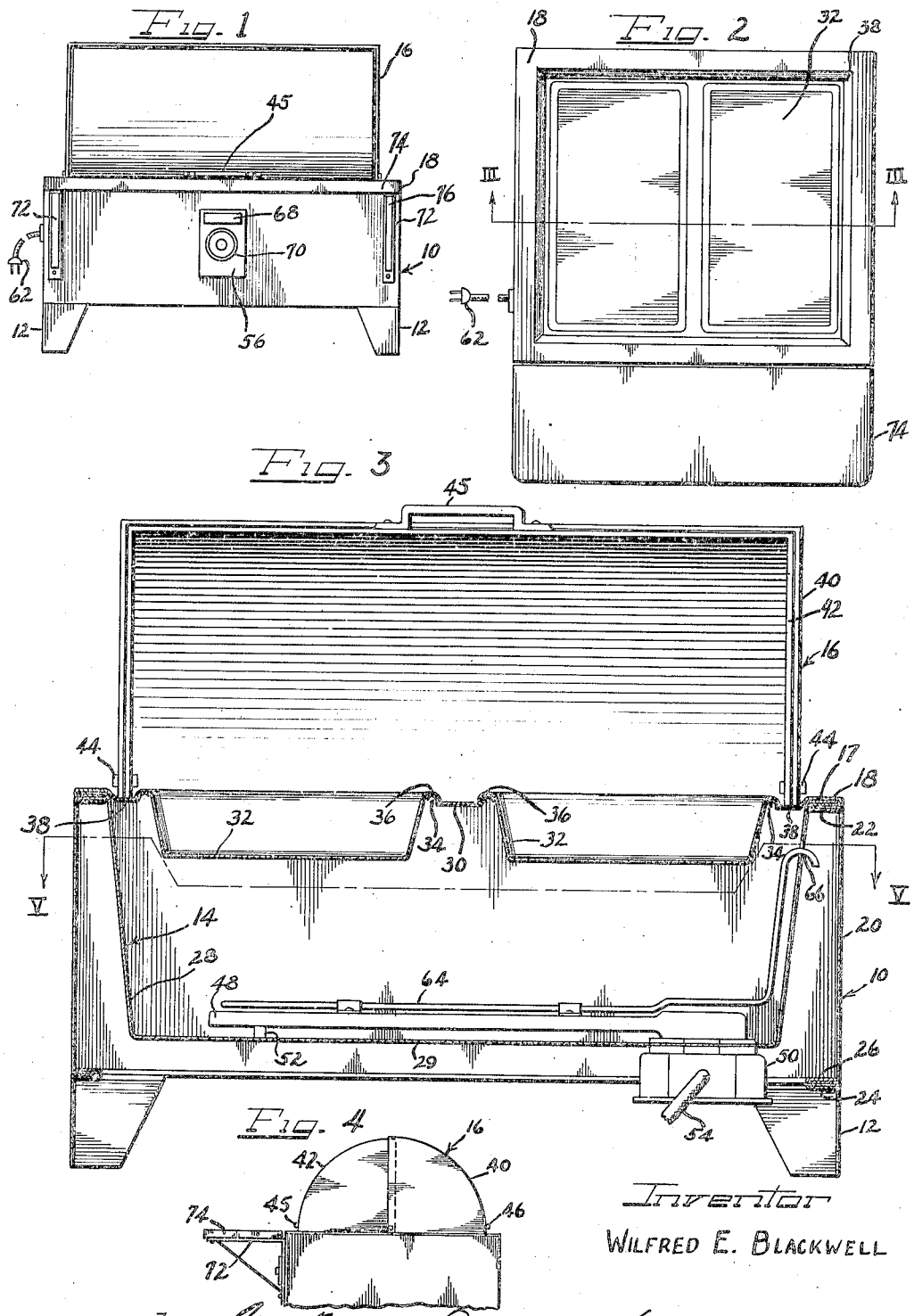

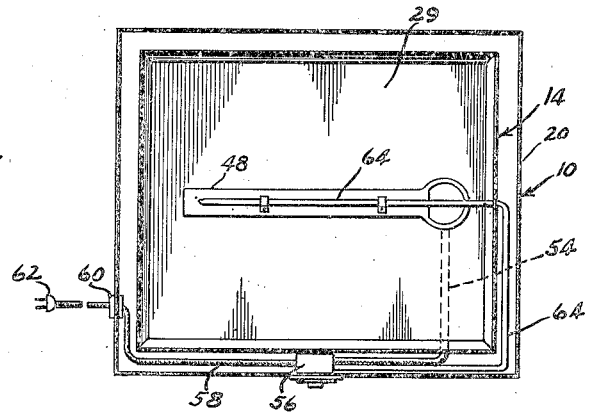
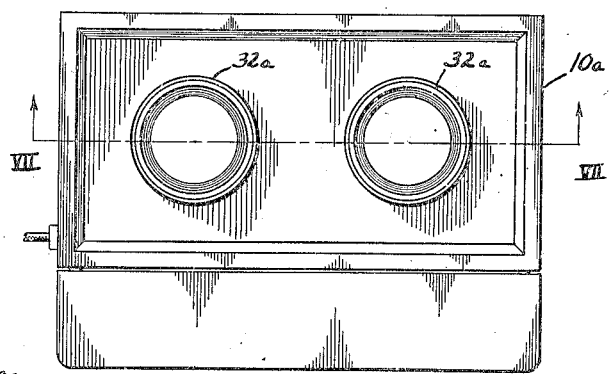
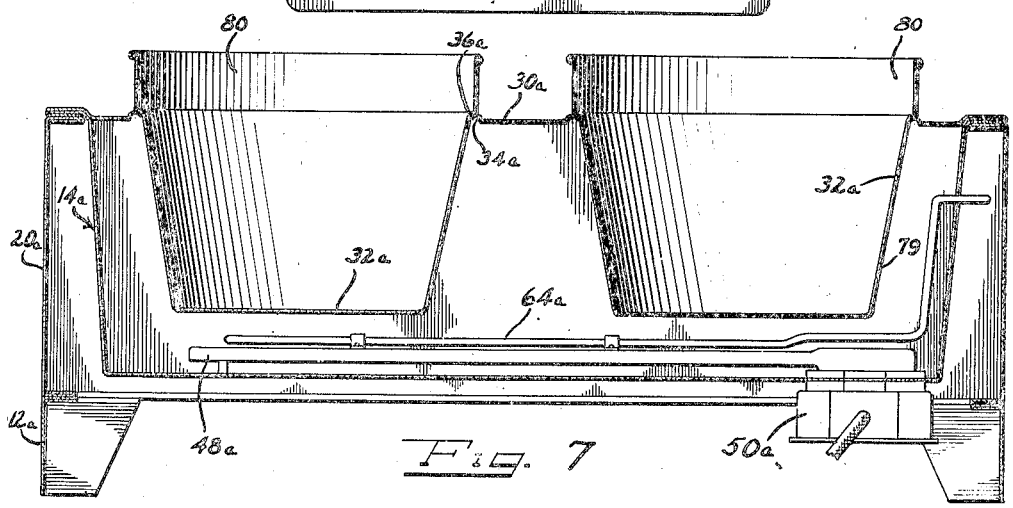

2,481,384

UNITED STATES PATENT OFFICE 2,481,384

PORTABLE ELECTRIC STEAM TABLE

Wilfred E. Blackwell, Mexico, Mo.

Application March 25, 1947, Serial No. 736,979

2 Claims. (Cl. 219—19)

My invention relates to a portable electric steam table capable of maintaining food and the like in a warm, palatable, condition over long periods of time.

When large quantities of food are desired to be served to groups of people on special occasions, such as church, lodge and club meetings, fairs, conventions, etc., it is necessary to maintain a relatively large quantity of food in a hot palatable condition for the relatively long period of time required to serve all patrons. Heretofore, this has been accomplished only by cooking the food in relatively small quantities so that the entire amount of food in one quantity is served before excessive cooling takes place. Steam tables and like devices conventionally used in large cafeterias and restaurants for maintaining food warm are not suitable for such occasions because the necessary sources of steam are ordinarily lacking and the weight and space requirements of such devices render moving expenses prohibitive in view of the short period of time they are in use. Moreover, the steam tables heretofore available have not been suitable for small cafeterias, schools, and the like or for emergency use in hotels, hospitals, etc., where no steam sources are available and the steam table must be easily removed to a suitable storage place.

It is accordingly a general object of the present invention to provide a portable compact steam table that does not require an external source of steam and is capable of maintaining food warm and palatable over long periods of time.

Another object of the present invention is to provide an improved steam table wherein spillage of food does not cause contamination of the water receptacle.

A further object of the present invention is to provide an improved compact electric steam table that is fool-proof in operation and will not overheat and cause damage.

It is yet another object of the present invention to provide an improved steam table of the portable type which is easily assembled, disassembled, and cleaned to the end that a unit of maximum utility is provided.

It is still another object of the present invention to provide an improved portable steam table having features of construction, combination and arrangement whereby it may be easily and inexpensively manufactured to the end that it may be used in service that does not justify the expense of a conventional steam table.

The novel features which I believe to be characteristic of the present invention are set forth with particularity in the appended claims. The invention, itself, however, both as to its organization and method of operation, together with further objects and advantages thereof, may best be understood by reference to the following description taken in connection with the accompanying drawings.

On the drawings:

Figure 1 is a front elevational view of one embodiment of this invention;

Figure 2 is a top plan view of the embodiment of this invention shown in Figure 1 but with the hood removed;

Figure 3 is a cross sectional view through the axis III—III, Figure 2, showing the arrangement of the elements within the structure of Figure 2 but with the hood in an open position;

Figure 4 is an end elevational view of the structure shown in Figure 1;

Figure 5 is a cross sectional view through the axis V—V, Figure 3, showing the disposition of the heating element within the water receptacle and the control elements within the housing;

Figure 6 is a top plan view of an alternative embodiment of the present invention; and Figure 7 is a cross section view through the axis VII—VII, Figure 6.

As shown on the drawings:

As will be evident from the front elevational view of Figure 1, the steam table of the present invention includes a housing, shown generally at 10, supported upon a plurality of legs 12 which are in turn supported from a suitable platform or table (not shown). A water receptacle or steam pan 14, Figure 3, is supported from the top edge of the housing 10 and defines a chamber within which steam is generated. A hood 16 rests on the top edge 18 of receptacle 14 so as to protect the food in the food serving pans 32 from air, dust, insects, etc., during the time food is not actually being served.

The construction of housing 10 may best be understood from the cross section view of Figure 3. As will be evident from this view, this housing is open at the top and bottom and is constructed entirely of sheet metal defining side walls 20 surrounding the steam pan 14 in spaced relation and having an inwardly extending flat marginal flange or upper edge portion 22 to engage and support an outwardly extending marginal flange or edge 18 of steam pan 14. The legs 12 are provided with inwardly extending top flanges or edges 24 which engage inturned lower flanges or edges 26 of side walls 20 to support the casing 10 from the legs 12. The flanges or edges 22, 24 and 26 are preferably of double thickness and the legs 12 may be attached by spot welding, bolting or the like.

As will be evident from Figures 2 and 3, the receptacle 14 has a tapered side wall 28 and a flat bottom 29 defining a lower pan portion to contain water. The receptacle 14 also has an upper cover portion 30 to sustain the food pans 32 in place and prevent spillage of food into the lower pan portion 28. The depth of receptacle 14 is such that legs 12 sustain it in spaced relationship with the platform upon which it is located so that there is no tendency unduly to heat the platform and sufficient space is allowed for outlet box 50.

The receptacle 14 is of sheet metal (preferably copper) and has an outwardly extending rim 17 around the upper edge of its side wall 28. The cover 30 is likewise of sheet metal and is provided with bent under crimped edge portions 18, which partially encircle rim 17 of portion 28 to form a fluid tight seal therewith and prevent the escape of steam from within the chamber formed by receptacle 14.

One of the features of the present invention resides in shaping cover portion 30 to catch food spilled during serving from pans 32. To this end, cover portion 30 is provided with a plurality of openings to receive food pans 32, these openings being shaped in accord with the shape of the pans themselves. Along the edge of these openings a raised bead or an upwardly extending embossed lip 34 is provided, this lip forming a semicircular shape extending upwardly from the level of cover portion 30 and being bent downwardly at the edge of the openings as will be evident from Figure 3. The food pans 32 are provided with similar downwardly extending embossments or lip portions 36 which are shaped to be received by the upwardly extending lip portions 34 of cover portion 30 to sustain the pans in position and to provide an intimate contact between the two lips 34 and 36. By this arrangement, the possibility of spilled food falling into the lower pan portion 28 of steam pan 14 is avoided since the engaging lips 34 and 36 provide a seal to prevent food deposited on the cover portion 30 from passing to the lower pan portion 28. This effect is supplemented by the rise of lips 34 above the surface of cover portion 30 which reduces the tendency of food spilled on cover 30 to pass between the lips 34 and 36.

The cover portion 30 of receptacle 14 further includes a flat section 38 adapted to receive the hood 16. This hood simply rests on cover 30 and may be removed for transportation or for serving. As will be evident from Figure 4, the hood consists of two portions, 40 and 42, shaped in the form of quarter cylinders and hinged together by pins 44. Moreover, portion 42 is disposed within portion 40 so that either may be rotated relative to the other to permit access to the food contained within food pans 32. Handle 45 is provided to facilitate manipulation of hood portion 42 and handle 46 is provided to aid manipulation of hood portion 40.

The heating mechanism for water contained within receptacle 28 may best be understood by reference to the cross sectional elevational view of Figure 3 and the cross sectional plan view of Figure 5. As will be evident from these views, an immersion type electric heater 48 is installed along the bottom portion of pan 28. This heater may, for example, include an electrical resistance element inserted within an enclosed metal tube so that passage of suitable current through the element heats the tube. The heater 48 is supported in the bottom portion of pan 28 by outlet box 50 and support 52. Outlet box 50 is of the moisture-proof, explosion proof type, and is supported in an opening in the bottom portion 29 of pan 28 by a waterproof contact which permits the passage of connecting wires to heater 48 through the pan 28. This contact might include, for example, a gasket and mechanism to tighten enclosure elements against the gasket to form a water-tight contact. As is best seen from Figure 5, electric cable or cord 54 connects outlet box 50 with the heating control elements contained within housing 56. Cable 58 is likewise connected to housing 56. This cable passes through the side wall 20 of casing 10 at gasket 60 and is provided with bayonet plug 62 at its remote end to be received in a conventional wall socket to supply electric power to the housing 56.

A capillary tube 64 is supported directly above heater 48. This tube extends upwardly at the edge of receptacle 14 to pass through that receptacle at point 66 which is above the normal level of water therein. From the point 66 capillary tube 64 passes along the space between housing 10 and receptacle 14 to housing 56.

The immersion heater 48 and capillary tube 64, together with the elements contained within housing 56, are of conventional construction and operate to maintain the water in the receptacle 14 at a predetermined rate of boiling sufficient to maintain the food within pans 32 in a warm condition without requiring excessive amounts of electrical energy or water. The elements in housing 56 include devices responsive to the operation of capillary tube 64 and which operate to discontinue the application of electrical energy to heater 48 when the tube 64 exceeds a predetermined temperature. Thus the heater 48 is cycled on and off in such fashion as to maintain the food in pans 32 in a desirable warm condition.

If the fluid level within pan 28 falls below the level of heater 48, the latter warms up to a greater than normal degree under the application of electrical energy and may burn out or destroy other portions of the mechanism if the application of electrical energy is not discontinued. Capillary tube 64 avoids this danger, inasmuch as it is located directly above and close to heater 48 and partakes of the temperature thereof, whether there is fluid within the pan or not. Thus, if the water level in receptacle 14 falls below normal and heater 48 heats to an increased degree, capillary tube 64 heats and application of electrical energy is discontinued before damage occurs. The housing 56 extends through the front panel portion of casing 10 as is best seen in Figures 1 and 5. As is further evident from the former figure, an indicator 68 is provided to show when the heating unit is in operation, this indicator comprising, for example, a suitable lamp which is energized when power is applied to the unit. In addition to indicator 68, a temperature control 70 projects through the front panel of casing 10. This control permits adjustment of the temperature at which food in pans 32 is maintained so as to permit accommodation of foods of various types.

A pair of brackets 72, Figure 1, are provided to support the extended shelf 74, Figure 2. This shelf is of wood or like material suitable for use in connection with serving of food from pans 32, viz. for carving, etc.

Figures 6 and 7 are top plan and sectional elevational views of an alternative embodiment of my invention, the view of Figure 7 being taken through the axis VII—VII, Figure 6. This embodiment of the invention is like that of Figures 1 through 5 except that the casing 10a and the receptacle 14a are shaped to accommodate two circular food pans 32a. The cover portion 30a of receptacle 14a is provided with two circular openings to accommodate the pans 32a and with upwardly extending lips 34a along the edge of these openings. These portions engage corresponding ledges 36a of the pans 32a to provide a seal against spillage of food into the receptacle 14a. That is, pans 32a include lower portions 79 and upper portions 80, the latter being of greater cross sectional area than the former and have lip edges 36a between these sections to engage the lips 34a. Moreover, the upper portions 80 of pans 32a permit a greater volume of food storage therein without requiring excessive depth of the pans below the level of cover 30a.

In other respects, the elements of the steam table of Figures 6 and 7 correspond with the elements of the structure of Figures 1 through 5, corresponding elements being designated by like numerals with the suffix "a" appended.

While I have shown particular embodiments of my invention, it will, of course, be understood that I do not wish to be limited thereto since many modifications both in the elements used and their cooperative structures may be made without departing from the spirit and scope of my invention. I, of course, contemplate by the appended claims to cover any such modifications as fall within the true spirit and scope of my invention.

What I claim as new and desire to secure by Letters Patent of the United States is:

1. A portable steam table comprising, in combination, a water receptacle having a bottom portion, side portions, and an outwardly extending rim along the upper edge of said side portions, an immersion heater disposed in the bottom of said receptacle to boil water therein, means for energizing said heater, a heat-sensitive capillary tube disposed on said heater in control of said means operative to de-energize said heater in response to variations from predetermined temperatures, a cover for said receptacle, said cover defining an opening to receive a serving pan, said opening having an upwardly extended rounded marginal lip along the edge thereof, and a serving pan, said pan defining a rounded area for mating engagement with said lip on said cover, said mating engagement of said pan and said cover operative to minimize heat loss from said water receptacle and spillage into said water receptacle, said steam table further including a housing for said receptacle, said housing including sheet metal side portions folded over to form inwardly extending upper edge portions to engage said rim of said receptacle to sustain said pan in spaced relationship with a platform upon which it may be located.

2. A portable steam table including in combination a water receptacle having a bottom portion, side portions, and an outwardly extending rim along the upper edge of said side portions, an electric heater disposed in the bottom of said receptacle to boil water therein, a capillary tube on said heater, a cover for said receptacle, said cover having its edges folded over said rim to form a fluid tight engagement therewith and a plurality of openings to receive food serving pans, said cover having an upwardly extending lip along the edge of each of said openings to engage correspondingly shaped portions of said food serving pans to prevent spillage of food to said receptacle, a housing for said receptacle, said housing including sheet metal side portions folded over to form inwardly extending upper edge portions to engage said rim of said receptacle to sustain said pan in spaced relationship with the platform upon which it is located, and means for energizing said heater when the water in said receptacle exceeds a predetermined quantity, said means responsive to actuation of said capillary tube disposed close to said heater in said receptacle and operative to deenergize said heater in response to variations from a predetermined temperature.

WILFRED E. BLACKWELL.

REFERENCES CITED

The following references are of record in the file of this patent:

UNITED STATES PATENTS

| Number | Name | Date |
|---|---|---|
| 1,475,631 | Herst | Nov. 27, 1923 |
| 1,513,357 | Webber | Oct. 28, 1924 |
| 1,693,522 | Medearis | Nov. 27, 1928 |
| 1,850,193 | Zahner | Mar. 22, 1932 |
| 2,043,797 | Horn | June 9, 1936 |
| 2,125,627 | Fonseca | Aug. 2, 1938 |
| 2,133,508 | Gundelfinger | Oct. 18, 1938 |
| 2,182,682 | Shroyer | Dec. 5, 1939 |
| 2,242,328 | Russell et al. | May 20, 1941 |
| 2,251,582 | White | Aug. 5, 1941 |
| 2,259,519 | Ershler | Oct. 21, 1941 |
| 2,378,772 | Hummel | June 19, 1945 |